(12) United States Patent
Flavel et al.

(10) Patent No.: US 9,432,263 B2
(45) Date of Patent: *Aug. 30, 2016

(54) NETWORK CONNECTIVITY WIZARD TO SUPPORT AUTOMATED CREATION OF CUSTOMIZED CONFIGURATIONS FOR VIRTUAL PRIVATE CLOUD COMPUTING NETWORKS

(71) Applicant: AT&T INTELLECTUAL PROPERTY I, L.P., Atlanta, GA (US)

(72) Inventors: Ashley Flavel, New York, NY (US); Carsten Lund, Berkeley Heights, NJ (US); Han Nguyen, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/315,532

(22) Filed: Jun. 26, 2014

(65) Prior Publication Data

US 2014/0310603 A1 Oct. 16, 2014

Related U.S. Application Data

(63) Continuation of application No. 13/771,188, filed on Feb. 20, 2013, now Pat. No. 8,819,195, which is a continuation of application No. 13/181,069, filed on Jul. 12, 2011, now Pat. No. 8,407,323.

(51) Int. Cl.
*H04L 12/24* (2006.01)
*G06F 9/455* (2006.01)

(52) U.S. Cl.
CPC ........... *H04L 41/22* (2013.01); *G06F 9/45558* (2013.01); *H04L 41/08* (2013.01); *H04L 41/0806* (2013.01); *H04L 41/0843* (2013.01); *H04L 41/0803* (2013.01)

(58) Field of Classification Search
CPC ... H04L 41/22; H04L 41/08; H04L 41/0806; H04L 41/0843; H04L 41/0803; G06F 9/45558
USPC ........................................................ 715/735
See application file for complete search history.

(56) References Cited

U.S. PATENT DOCUMENTS

| 8,462,780 B2 | 6/2013 | Vincent et al. |
| 2011/0016214 A1 | 1/2011 | Jackson |
| 2011/0231899 A1 | 9/2011 | Pulier et al. |

(Continued)

*Primary Examiner* — Viet Vu
(74) *Attorney, Agent, or Firm* — Greenblum & Bernstein, P.L.C.

(57) ABSTRACT

A user is provided an interface for selecting network connectivity features for designing a virtual private cloud computing network. Each network connectivity feature has an attribute for connecting tangible storage elements and tangible computing elements in the virtual private cloud computing network. Each network connectivity feature is translatable into a network element configuration statement that instantiates an action particular to the network connectivity feature. Usage rules are defined specifying how the network connectivity features can be used. Selected network connectivity features are accepted from the user. The virtual private cloud computing network is configured in accordance with the selected network connectivity features using the tangible storage elements and tangible computing elements in the virtual private cloud computing network. The virtual private cloud computing network is implemented in accordance with the selected network connectivity features using the tangible storage elements and tangible computing elements in the virtual private cloud computing network.

20 Claims, 8 Drawing Sheets

(56) References Cited

U.S. PATENT DOCUMENTS

| | | |
|---|---|---|
| 2012/0147894 A1 | 6/2012 | Mulligan et al. |
| 2012/0185913 A1 | 7/2012 | Martinez et al. |
| 2012/0185925 A1 | 7/2012 | Barkie et al. |
| 2012/0221789 A1 | 8/2012 | Felter |
| 2012/0222106 A1* | 8/2012 | Kuehl ............... H04L 63/0209 726/11 |
| 2012/0290647 A1 | 11/2012 | Ellison et al. |

* cited by examiner

NETWORK CONNECTIVITY WIZARD TO SUPPORT AUTOMATED CREATION OF CUSTOMIZED CONFIGURATIONS FOR VIRTUAL PRIVATE CLOUD COMPUTING NETWORKS

CROSS-REFERENCE TO RELATED APPLICATIONS

This application is a pending continuation of U.S. patent application Ser. No. 13/771,188, filed on Feb. 20, 2013, now U.S. Pat. No. 8,819,195, which is a continuation of U.S. patent application Ser. No. 13/181,069, filed on Jul. 12, 2011, now U.S. Pat. No. 8,407,323, the disclosures of which are expressly incorporated herein by reference in their entirety.

BACKGROUND

1. Field of the Disclosure

The present disclosure relates to cloud computing networks. More particularly, the present disclosure relates to a network connectivity wizard for designing customized virtual private cloud computing networks.

2. Background Information

Cloud computing networks provide network customers with on-demand network resources from the existing network of a cloud computing network service provider. Customers can request cloud computing network resources to support customer applications that might otherwise only be implemented on the customers' internal network resources. Configuration management for cloud computing networks is automated. Service providers predefine selectable standardized configuration templates, and customers select a predefined configuration template when network resources are to be requested to support a customer application. The selected predefined configuration template is populated to generate a configuration of network elements sufficient to support the customer application.

DETAILED DESCRIPTION

Figure 1:
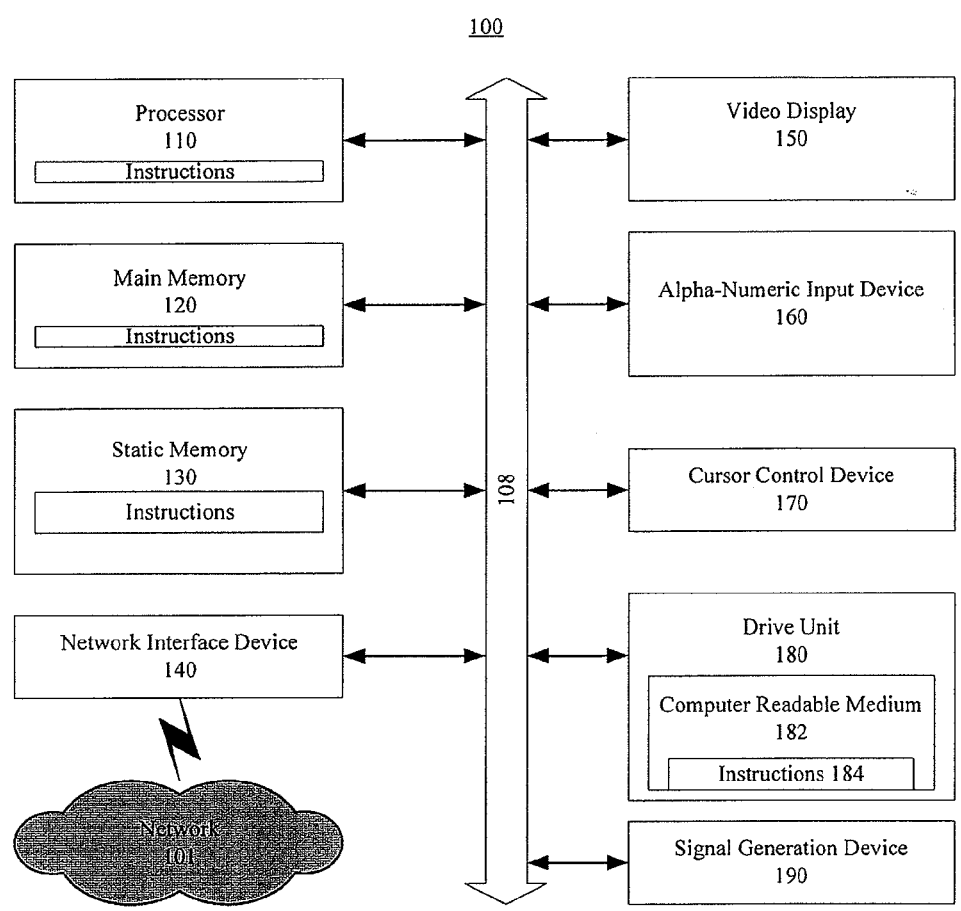
FIG. 1 shows an exemplary general computer system that includes a set of instructions for a network connectivity wizard to support automated creation of customized configurations for virtual private cloud computing networks described herein.

In view of the foregoing, the present disclosure, through one or more of its various aspects, embodiments and/or specific features or sub-components, is thus intended to bring out one or more of the advantages as specifically noted below.

As described herein, an automated and intelligent network connectivity wizard enables a customer of cloud computing (CC) services to create a customized network connectivity configuration for a virtual private cloud computing network. The network connectivity wizard may be embodied by a software program of computer-readable instructions that performs or assists in performing a method when executed by a device run by a customer or administrator. A user uses the network connectivity wizard to select individual network connectivity functions to create a virtual private cloud computing network. The network connectivity wizard may be downloaded to a customer's personal computer or mobile computing device, or displayed as interactive web pages using a browser on the personal computer or mobile computing device. The customer or an administrator select among choices in the downloaded program or on the webpage to choose building blocks and input configuration parameter data to create a customized virtual private cloud computing network.

A virtual private cloud computing network defines a logical grouping of dedicated resource elements across locations within a cloud computing network. The resource elements are dedicated for use in individual virtual private clouds so that any particular resource element need not be simultaneously tasked to multiple virtual private clouds though multiple virtual private cloud computing networks may simultaneously exist within a single actual cloud computing network. Any particular virtual private cloud computing network may exist at one or more than one location. The customized network connectivity configuration created using the network connectivity wizard links cloud computing resource elements for a virtual private cloud computing network and provides network access for administrators and end-users.

Cloud computing resource elements as described next may be implemented using tangible and non-transitory computers with processors and tangible and non-transitory memories. However, cloud computing resource elements are not necessarily the entirety of any particular computer or memory, and may instead be dedicated capabilities of less than the entire capabilities of a computer or memory. Computers may include server computers, and memories may include databases external to computers as well as memories internal to computers. Examples of cloud computing resource elements implemented using computers and memories as described herein include:

virtual machines (VMs)

virtual storage (VS), such as virtualized storage disk virtual appliances (VAs), such as virtualized load balancers, firewalls, etc.

Computers and memories of cloud computing networks may be organized in data centers in distributed geographic locations. Each data center may include multiple computers and memories. Virtual machines, local load balancers and firewalls are isolatable resource elements implemented using the computers and memories, whether in data centers or external to data centers.

A virtual private cloud (VPC) may include one or more virtual data centers (VDCs) that each defines a logical grouping of virtual machines, local load balancers, firewalls and other network resource elements at a single location. Multiple virtual data centers may be supported within the same actual data center at a location. Conversely, a single virtual data center may be supported by multiple data centers at distributed locations.

Virtual machines (VMs) are objects within a virtual data center. Virtual machines are characterized by dedicated capabilities and capacities of computers and memories such as central processing unit capability, memory capacity, and local hard disk capacity. A local load balancer and a firewall are appliances within a virtual data center. Virtual machines, firewalls and local load balancers all interface customer subnets in a virtual data center of a virtual private cloud.

A customer subnet (CS) is also a network connectivity object within a virtual data center, and enables communication amongst compute resource endpoints (such as VMs, VAs) sharing a common IP address prefix, or also with compute resource endpoints or end-users in other IP address prefixes via a VA/VM. A customer subnet as described herein may be a routed customer subnet or a switched customer subnet. A routed customer subnet is connected directly to a wide area network such as the internet or a virtual private network, and is associated with intra-cloud connectivity. Examples of virtual private networks include layer 3 networks such as multi-protocol label switching network layer 3 networks, and layer 2 networks such as ethernet layer 2networks or multi-protocol label switching layer 2 networks. A switched customer subnet is reachable only via an interface with a virtual appliance or virtual machine that also interfaces another customer subnet.

A virtual private cloud (VPC) has one or more intra-cloud connectivities in order to qualify as a valid service and communicate with external devices. Intra-cloud connectivity describes connectivity both between virtual data centers within a virtual private cloud and between a virtual data center in a virtual private cloud and access to an external wide area network such as the internet or a virtual private network. Intra-cloud connectivity is associated with routed customer subnets within the virtual data centers to enable connectivities between the different virtual data centers, to enable connectivities between different routed customer subnets in a single virtual data center, and to enable access to a wide area network such as an the internet or a virtual private network.

Intra-cloud connectivity (ICC) types include public, L3VPN, and L2VPN. Public intra-cloud connections are connections between customer subnets through public network infrastructure such as the internet. External access to a public intra-cloud connection is available through the internet. L3VPN intra-cloud connections are connections between customer subnets through a layer 3 multi-protocol label switching (MPLS) virtual private network (VPN). External access to L3VPN intra-cloud connections is available through virtual private networks. L2VPN intra-cloud connections are connections between customer subnets through a layer 2 VPLS virtual private network. Other intra-cloud connection types may also be available for selection by a customer.

A virtual network interface card (VNIC) is an object that connects a virtual machine to a customer subnet. A virtual machine may have multiple virtual network interface cards that each provides network connectivity to a single customer subnet. Network attributes such as internet protocol (IP) address and MAC address are associated with the virtual network interface card.

A virtual load balancer (LLB) appliance is a virtualized load balancer with interface(s) on a single customer subnet. A customer may configure load-balancing policies on the local load balancer to balance the traffic loads directed to virtual machines on the same customer subnet at the local load balancer. Local load balancers are used to distribute loads among virtual machines on a customer subnet, and a global load balancing capability may be provided to distribute load distribution among multiple local load balancers for different subnets.

A virtual firewall is a virtualized firewall with interfaces on multiple customer subnets, to prevent unauthorized traffic between customer subnets. A firewall may be split into two sub-objects—firewall fronts and firewall backs. Each firewall front/back must be associated with a single customer subnet. A firewall front has connectivity out of the virtual data center. A firewall back has connectivity further into the virtual data center. A single firewall instance may have multiple firewall backs associated with it.

Using the resource elements and features described above as building blocks, virtual private clouds with arbitrarily complex connectivity requirements can be designed and created by or for a customer. As a first example of a virtual private cloud that can be configured using the network connectivity wizard described herein, a customer can design a virtual private cloud with a single virtual data center provided with public intra-cloud connectivity to internet access. In this first example, two customer subnets can exist within the virtual data center, including a routed customer subnet connected to the public intra-cloud connectivity and an switched customer subnet connected to the routed customer subnet through a firewall. A virtual machine interfaces to the switched customer subnet, and a static route is configured in the public intra-cloud connection to direct traffic to the switched customer subnet through the routed customer subnet and the firewall. In this example, the routed customer subnet in front of the firewall may be shared across multiple customers if no customer-specific resources exist on the routed customer subnet. Each resource element of the virtual private cloud and details and characteristics of the connectivity for the resource elements may be selected using the network connectivity wizard as described herein.

A shared storage volume is another object associated with a virtual data center. A shared storage volume represents a shared storage device across all virtual machines within the virtual data center. Access controls may prevent certain virtual machines from having access to a shared storage volume. Multiple volumes can be associated with a virtual data center if such a technical solution exists and is required for a business need. In a second example that is a modification of the first example described above, a shared storage may be made available within the virtual data center, and virtual machines within the virtual data center may have access to the shared storage volume.

An intra-virtual data center customer subnet may also exist within a virtual data center. An intra-virtual data center customer subnet (intra-VDC CS) is a customer subnet with an address space not reachable via the internet. The only way to reach an intra-virtual data center customer subnet is by interfacing the intra-virtual data center customer subnet with a virtual machine or appliance that also interfaces another customer subnet within the virtual data center. An intra-virtual data center customer subnet may be used for backend applications such as databases, and provides security by preventing public access from the internet to the address space on the intra-virtual data center customer subnet.

A third example that is also a modification of the first example described above uses an intra-virtual data center customer subnet connected via a virtual machine to the switched customer subnet in the first example. In the third example, a second virtual machine may also solely interface with the intra-virtual data center customer subnet. In a fourth example that is a modification of the third example, the intra-virtual data center customer subnet and the indirect subnet are each separately connected with the routed customer subnet via the firewall, so that the first virtual machine that interfaces the switched customer subnet does not also interface the intra-virtual data center customer subnet.

According to an aspect of the present application, orchestration methods described herein do not limit customers to predefined templates, but rather allow customers to create supportable customized configurations and configuration templates that can be instantiated in the same manner as predefined templates. Customers may have multiple accounts, and one or more virtual private cloud may be created for each account of a customer to accomplish different business needs. Thus, a single customer may have multiple accounts for a cloud computing service provider, and each account may be used to create multiple virtual private cloud computing networks within the cloud computing network of the cloud computing service provider.

According to the present disclosure, a cloud computing networking wizard includes a library of network connectivity functional building blocks (BBs) and usage rules (URs). Each building block represents a network connectivity function or characteristic that a customer can request. Examples of network connectivity function requests include:

- requests to create a new virtual private cloud computing network
- requests for cloud computing resource elements for a virtual private cloud computing network
- requests for customer subnets for a virtual private cloud computing network
- requests to link cloud computing resource elements into a local subnet of a virtual private cloud computing network
- requests to link customer subnets into a virtual data center of a virtual private cloud computing network
- requests to provide end-user/administrator access to a virtual private cloud computing network via a particular internet protocol (IP) access service type
- requests for a type of intra-cloud connectivity for a particular subnet
- requests for customer subnet to be either a routed customer subnet or an switched customer subnet
- requests for intra-virtual data center customer subnets, and particular connections to other customer subnets via virtual machines or appliances
- requests particular interfaces for virtual machines and appliances with customer subnets
- requests for new virtual data centers to be configured in actual data centers where other virtual data centers do not yet exist for the customer or for an account of the customer
- requests for new virtual data centers to be configured as clones of existing virtual data centers but in a different actual data center than the existing virtual data center
- requests for multiple virtual data centers, and how to connect each virtual data center to the same or different intra-cloud connectivities Each selectable building block has a set of user-definable attributes and can be translated into a set of network-element configuration statements. The customer or administrator selects the building blocks using the network connectivity wizard, and after processing as described herein the requested virtual private cloud computing network is created for the customer. Network-element configuration statements can be used to instantiate the desired building block function, and are in programming languages and formats specific to the different devices to be configured to instantiate the requested virtual private cloud computing network. Thus, languages and formats for the configuration statements ultimately used to configure network resources on cloud computing network devices may differ. The user rules are a set of concise, machine-readable rules specifying how the building blocks of various types can be used and also chained/combined into larger network configurations.

A configuration synthesizer enables a customer or administrator to assemble various building block types into a customized configuration template, and validate the customized configuration template against the set of usage rules. The configuration synthesizer can operate in interactive mode to enable a customer administrator/agent to select and assemble building blocks via a web graphical user interface (GUI) drag-and-drop, with validation feedback provided in real-time as the user selects building blocks one at a time, or in batch mode as the user submits the completely composed configuration template as a batch.

A configuration instantiator enables a customer to create an implementation instance of a template by filling out the template configuration parameter data. Template configuration parameter data may include, for example, an internet protocol address prefix chosen for a subnet, or the number of virtual machines to interface to a particular subnet.

Finally, the configuration parser enables the customer to decompose a template instance into building block instances which subsequently are translated into corresponding configuration statement snippets to be downloaded into the involved network-elements.

The present disclosure enables any cloud computing service customer to create a customized virtual private cloud computing network connectivity topology template to meet the needs of a particular cloud computing application. Since the customized template is build out of well-defined building block functions, the customized template can be can instantiated just as easily as a predefined standard configuration template.

FIG. 1 is an illustrative embodiment of a general computer system that includes a set of instructions for performing processes for a network connectivity wizard to support automated creation of customized configurations for virtual private cloud computing networks as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, bridges, devices, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a web server, a coordination server, any other type of server, a router or other routing device, a personal computer (PC), a tablet PC, a set-top box (STB), a personal digital assistant (PDA), a mobile device, a palmtop computer, a laptop computer, a desktop computer, a communication device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video and/or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The present application describes mechanisms to provide a network connectivity wizard to support automated creation of customized configurations for virtual private cloud computing networks of cloud computing networks. Using the network connectivity wizard, the virtual private cloud computing networks may be formed for a limited and defined duration, for a limited and defined purpose, and for a limited and defined group of end users of the customer. The resource elements can include capabilities of computers with processors, data storage, appliances such as firewalls that define who can access memory, and load balancers that balance computing loads imposed on the computers with processors.

An example of a network connectivity wizard to support automated creation of customized configurations for virtual private cloud computing networks uses a website to allow customers to download a network connectivity wizard computer program. The network connectivity wizard includes a building block library that defines different building blocks that a customer can use to define the requested virtual private cloud computing network.

Figure 2:
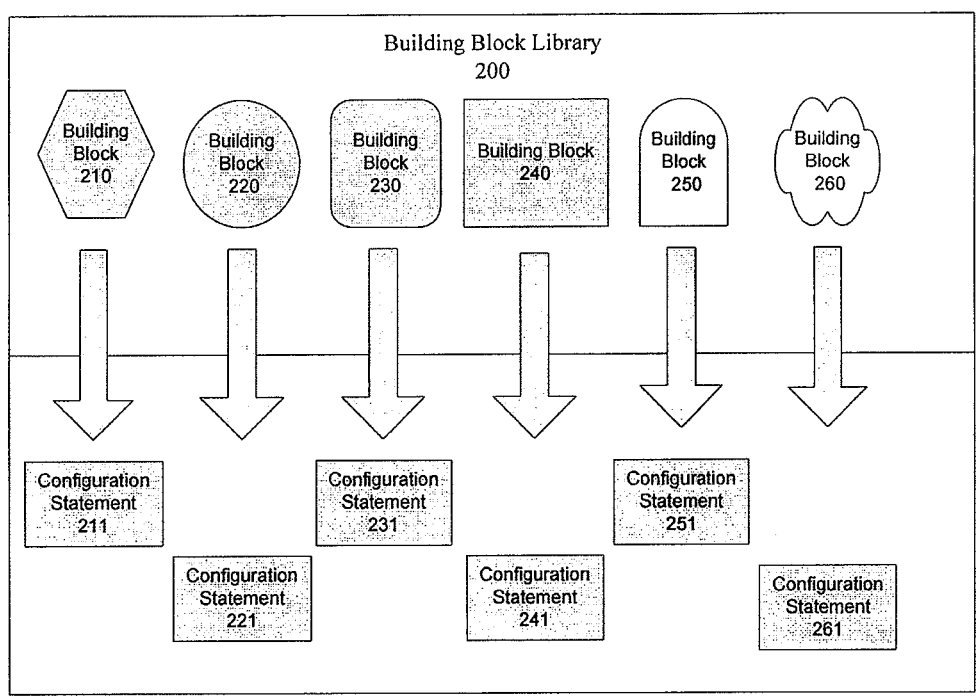
FIG. 2 shows an exemplary library for a network connectivity wizard to support automated creation of customized configurations for virtual private cloud computing networks described herein, according to an aspect of the present disclosure.

FIG. 2 shows an exemplary library for a network connectivity wizard to support automated creation of customized configurations for virtual private cloud computing networks described herein. In FIG. 2, the building block library 200 includes different building blocks 210, 220, 230, 240, 250 and 260. The different building blocks 210, 220, 230, 240, 250 and 260 in FIG. 2 represent network connectivity functions that a user can request. Examples of building blocks 210, 220, 230, 240, 25 and 260 include requests to link cloud computing resource elements into a local subnet, requests to link cloud computing subnets into a larger cloud computing network, and requests to provide end-user or administrator access to the cloud computing network via a particular internet protocol access service type. The building block library 200 may be provided in a network connectivity wizard computer program downloaded by a customer from a website.

As shows in FIG. 2, each building block 210, 220, 230, 240, 250 and 260 can be translated into a set of network-element configuration statements that would serve to instantiate the building block. Each building block has a set of user-definable attributes, such as layer 2 or layer 3 forwarded, public or private connected, etc. The user-definable attributes of each building block can be translated into a set of parameter values for network-element configuration statements that would serve to instantiate the function of the building block.

Figure 3:
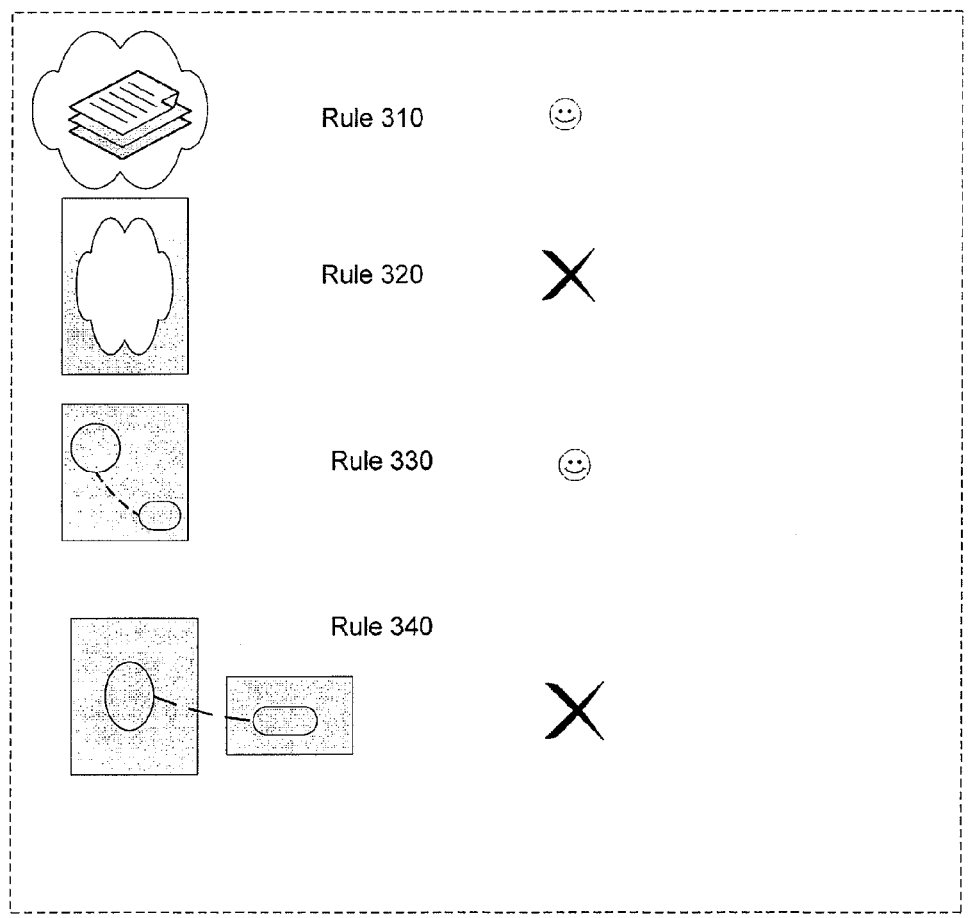
FIG. 3 shows an exemplary rule set for a network connectivity wizard to support automated creation of customized configurations for virtual private cloud computing networks, according to an aspect of the present disclosure.

FIG. 3 shows an exemplary rule set for a network connectivity wizard to support automated creation of customized configurations for virtual private cloud computing networks described herein. In FIG. 3, rules 310, 320, 330 and 340 are each drafted as logical statements of what is allowed and what is not allowed by the network connectivity wizard. Usage rules are concise, machine-readable rules specifying how the building blocks of various types can be used and also chained/combined into larger network configurations. The usage rules may be provided with the building block library of FIG. 2 in a network connectivity wizard computer program downloaded by a customer from a website.

The usage rules can be enforced in real-time for building blocks used to request network connectivity functions for a virtual private cloud computing network. Alternatively, the usage rules can be enforced for a batch of building blocks used to request network connectivity functions for a virtual private cloud computing network. Also, as an alternative to the usage rules being provided in a downloaded network connectivity wizard computer program, the usage rules may also be enforced by a coordination server of the provider of the cloud computing network that receives one or a batch of building block requests for a virtual private cloud computing network.

Figure 4:
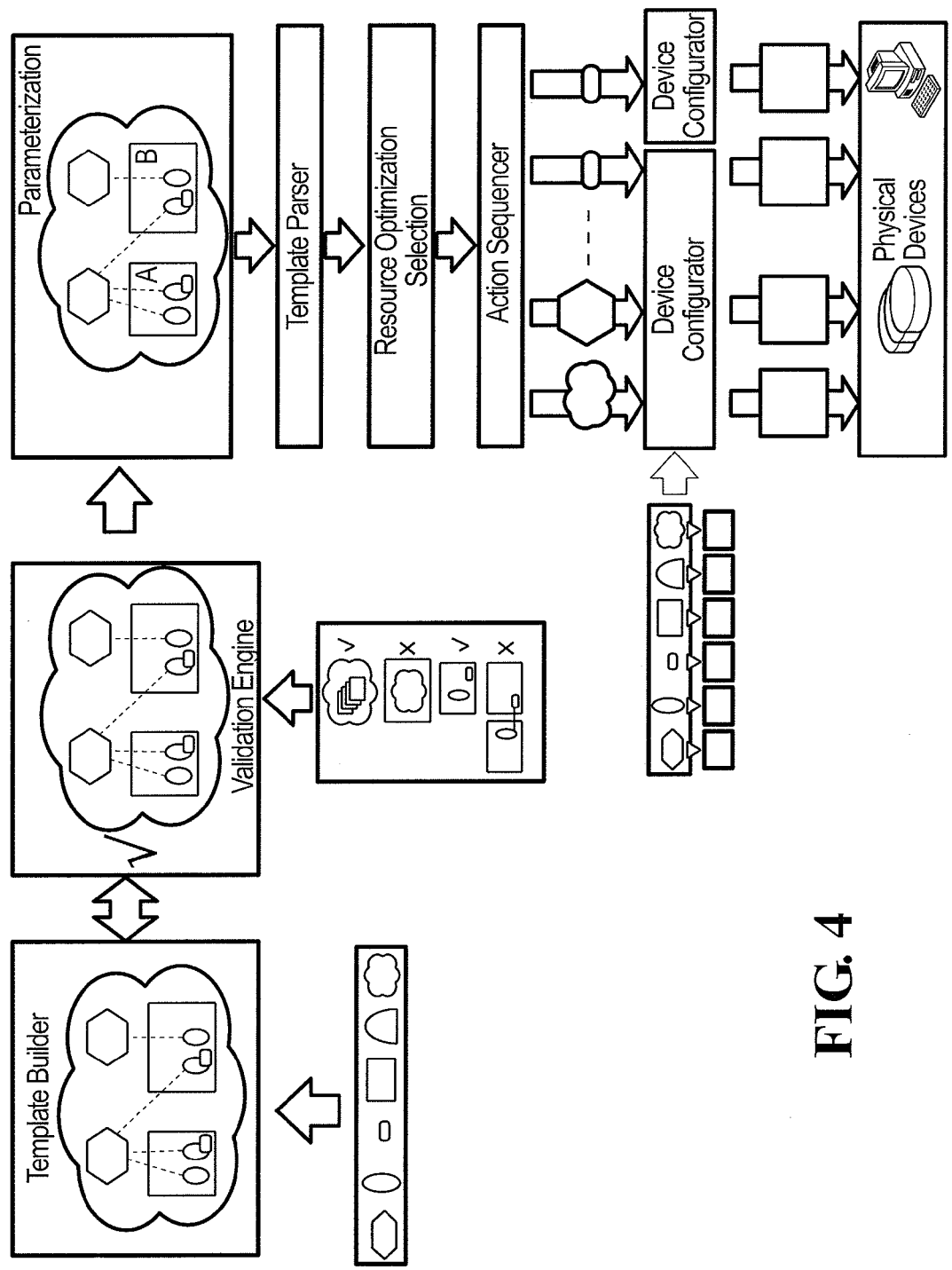
FIG. 4 shows another exemplary process for a network connectivity wizard to support automated creation of customized configurations for virtual private cloud computing networks described herein, according to an aspect of the present disclosure.

FIG. 4 shows an exemplary process for a network connectivity wizard to support automated creation of customized configurations for virtual private cloud computing networks described herein. As shown in FIG. 4, building blocks are fed to a template builder that builds a template for a virtual private cloud computing network. The template is validated against usage rules by a validation engine. Once validated, the template is parameterized by a parameterization module (template instanstiator) that includes populating the template with data. The parameterized template is then parsed by a template parser. Resource elements from the larger cloud computing network are then selected for the virtual private cloud computing network so that the use of the resource elements is optimized. An action sequencer then determines the order in which a set of specified actions should be performed. A device configurator then retrieves the configuration statements for each selected building block in the parameterized and optimized template, and configures and downloads the appropriate configuration statements to the network elements that will collectively define the virtual private cloud computing network.

An example of a virtual private network created using the process shown in FIG. 4 involves an intra-virtual data center customer subnet behind a firewall. In this example, firewall support for network address translation (NAT) is selected so that a pre-determined set of public internet protocol addresses setup to be routed to the firewall can be directed to the intra-virtual data center customer subnet. In this example, a virtual machine on the intra-virtual data center customer subnet may have a private internet protocol block such as 10.0.0.0/24. The virtual machine sitting on this customer subnet may have an internet protocol address 10.0.0.10. The firewall may take an internet protocol address from the pre-determined public address space such as 12.0.0.10 and translate this to the private internet protocol address. In other words, a rule in the firewall/network address translation functionality exists such that 12.0.0.10 is translated to 10.0.0.10. This is solely a firewall capability and not a networking capability. This firewall capability can be offered to customers for selection as a building block in the network connectivity wizard. Network address translation allows a customer to select a large prefix size because public internet protocols addresses are only assigned upon creation of a virtual machine. The prefix comes from private internet protocol address space and may be replicated across different customers using firewall support. Additionally, this firewall capability avoids wasting public internet protocol addresses by allowing a customer to assign private internet protocol addresses to virtual machines on a subnet, by allowing internet protocol addresses for appliances such as firewalls and load balancers come from public address space, and by allowing a customer to select the smallest subnet.

In the example described above, using the network connectivity wizard, the customer selects building blocks to create a virtual private cloud. The selectable building blocks include:

the number, types and connection arrangements of customer subnets
 type of intra-cloud connectivity
 the number and arrangement of virtual machines
 the use of a firewall and use and details of network address translation (NAT)

Figure 5:
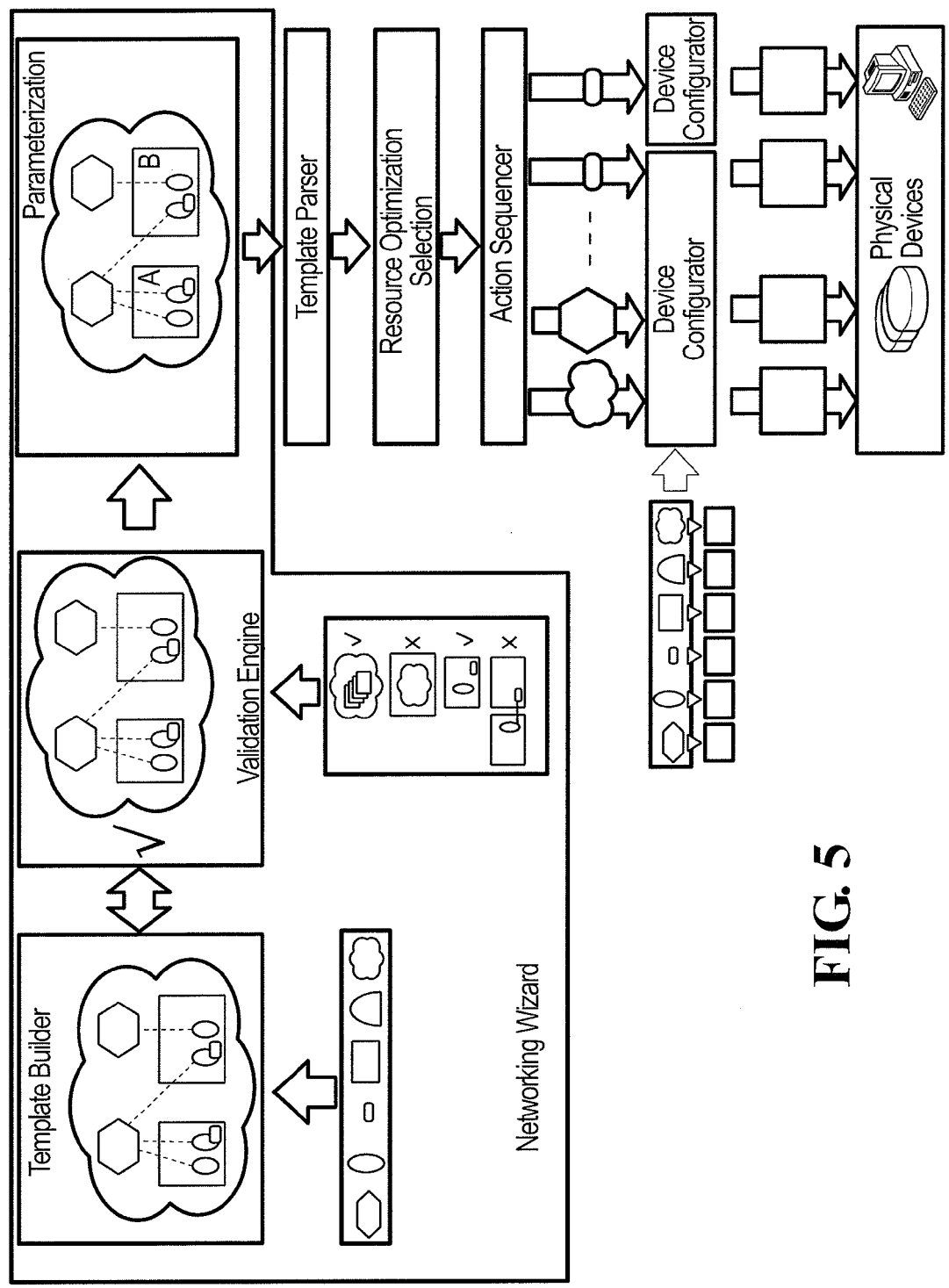
FIG. 5 shows an exemplary networking wizard in the context of the exemplary process shown in FIG. 4, according to an aspect of the present disclosure.

FIG. 5 shows an exemplary networking wizard in the context of the exemplary process shown in FIG. 4. As shown in FIG. 5, the networking wizard includes the building block library, the usage rules, the template builder that builds a template out of the building block library, the validation engine that validates the template against the usage rules, and the parameterization module that parameterizes the validated template. In FIG. 5, the actions from the process in FIG. 4 not performed using the networking wizard are performed by a coordination server of the provider of the cloud computing network. For example, the parameterized template is parsed by a template parser on a coordination server of the provider of the cloud computing network rather than the user device to which the networking wizard program is downloaded. Resources are also optimized and selected by a coordination server of the provider rather than the user device. Subsequent actions such as the action sequencing and the device configuration downloading are also performed by the coordination server of the provider rather than the user device.

As described above for FIG. 5, the networking wizard program downloaded to a user device performs several of the actions in designing and implementing a virtual private cloud computing network. However, all or part of the actions shown in FIGS. 4 and 5 may be performed on and by a coordination server rather than a user device, such as when all or part of the networking wizard is executed on the website of the network provider rather than on a user device to which all or part of the networking wizard program is downloaded. In any embodiment, the result is that configuration statements for each selected building block in the parameterized and optimized template are retrieved, and the appropriate configuration statements are configured and downloaded to the network elements that will collectively define the virtual private cloud computing network.

Figure 6:
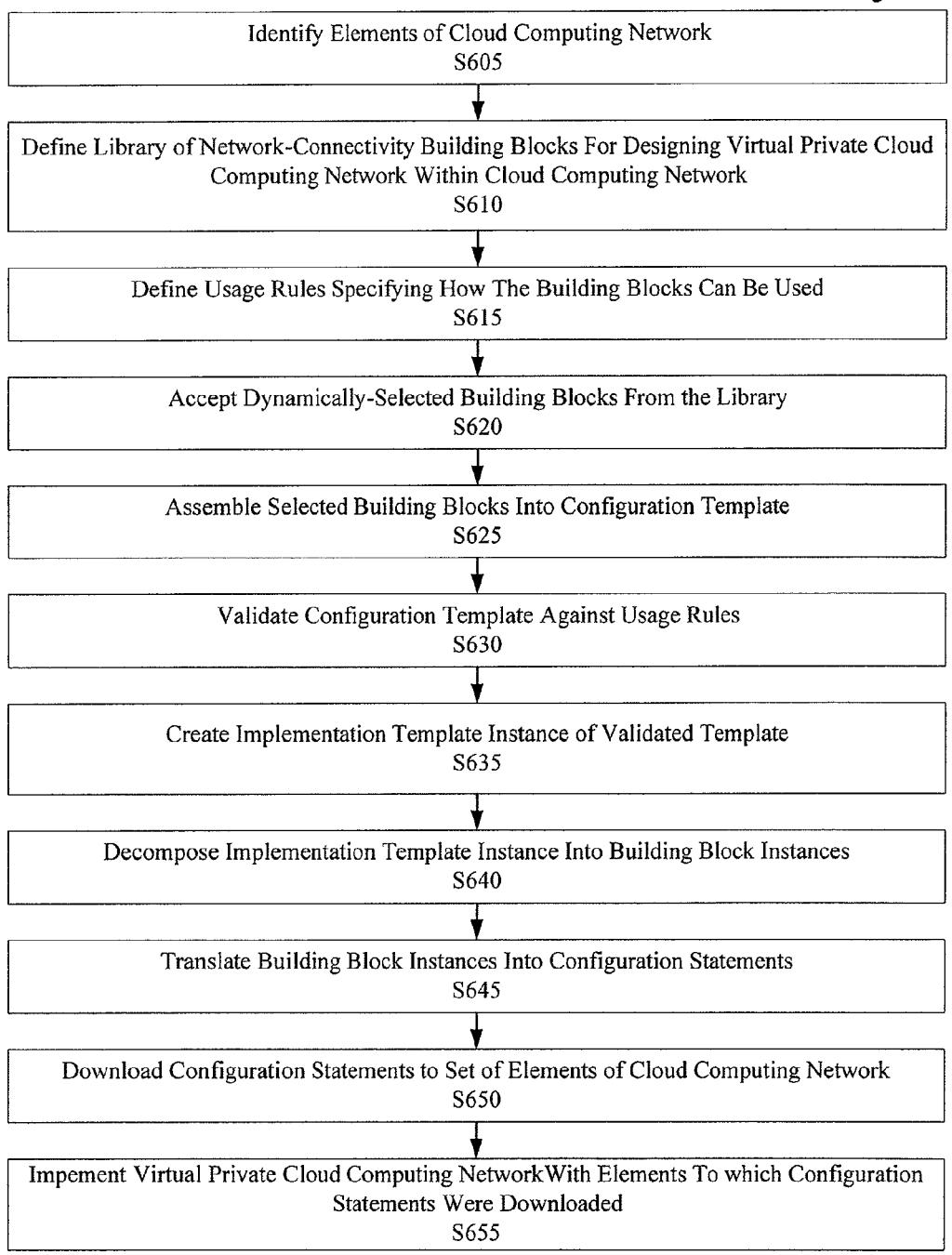
FIG. 6 shows another exemplary process for a network connectivity wizard to support automated creation of customized configurations for virtual private cloud computing networks, according to an aspect of the present disclosure.

FIG. 6 shows another exemplary process for a network connectivity wizard to support automated creation of customized configurations for virtual private cloud computing networks. In FIG. 6, elements of a cloud computing network are identified at S605. At S610, a library of network connectivity building blocks is designed. The building blocks are for designing a virtual private cloud computing network within a cloud computing network. At S615, usage rules are defined. The usage rules specify how building blocks can be used. At S620, dynamically-selected building blocks from the library are selected. At S625, selected building blocks are assembled into a configuration statement. At S630, a configuration template is validated against usage rules. At S635, an implementation template instance of a validated template is created. At S540, the implementation template instance is decomposed into building block instances. At S645, building block instances are translated into configuration statements. At S650, configuration statements are downloaded to a set of elements of the cloud computing network. At S655, the virtual private cloud computing network is implemented with elements to which configuration statements were downloaded.

Figure 7:
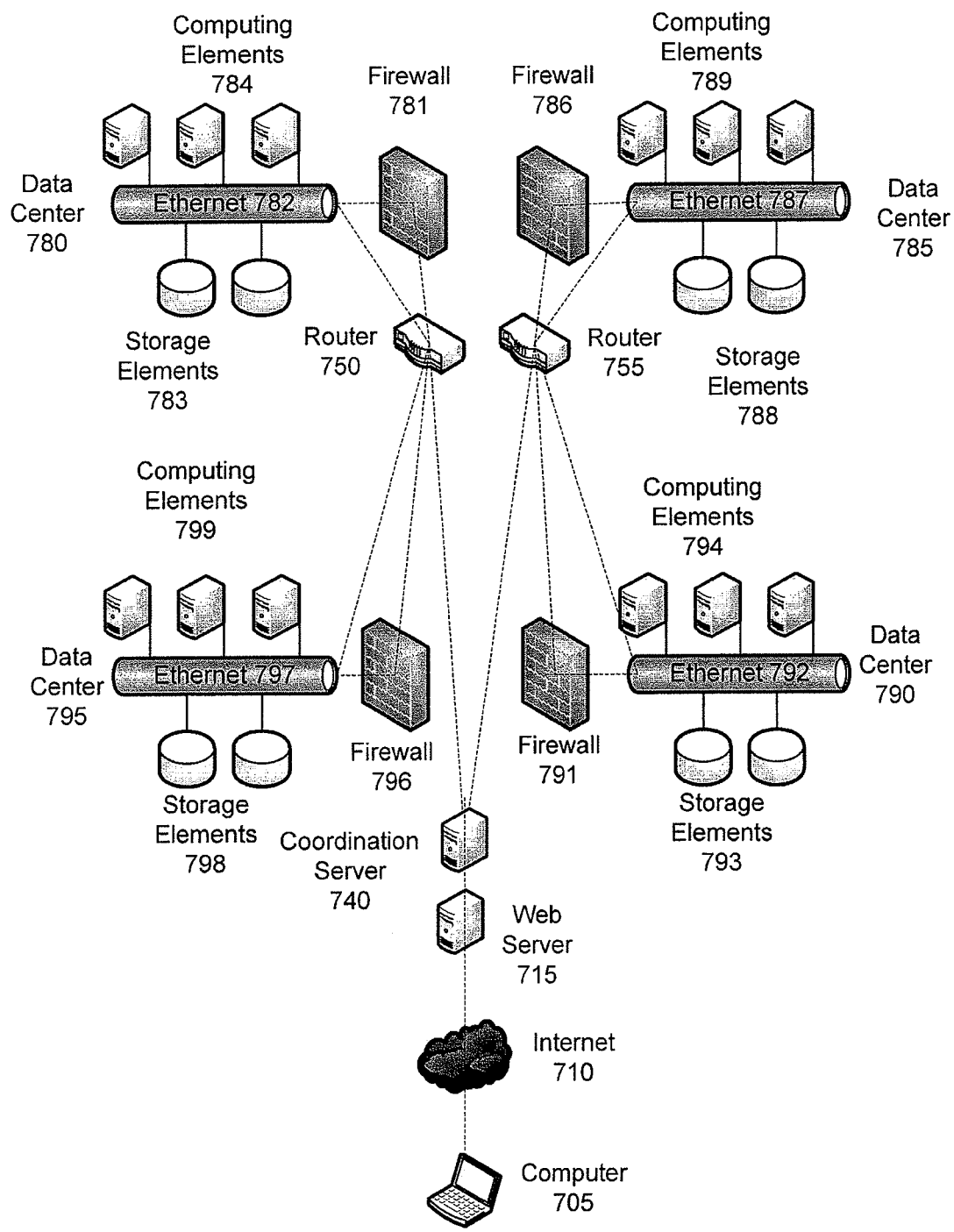
FIG. 7 shows an exemplary cloud computing network for a network connectivity wizard to support automated creation of customized configurations for virtual private cloud computing networks, according to an aspect of the present disclosure.

FIG. 7 shows an exemplary cloud computing network for a network connectivity wizard to support automated creation of customized configurations for virtual private cloud computing networks. In FIG. 7, a computer 705 is used by a user to download all or part of a networking wizard program over the internet 710 from a web server 715. The web server 715 provides a webpage and the downloadable portion of the network connectivity wizard for viewing and downloading by a user of the computer 705.

A coordination server 740 implements the implementation template instance, and may also perform the validation of the configuration template when the validation is not performed by the computer 705. The coordination server 740 coordinates the creation and implementation of virtual private cloud computing networks among the various elements and subnets of the cloud computing network. The coordination server 740 communicates with various elements and subnets of the cloud computing network via routers 750, 755 and other routing components of a communications network.

The cloud computing network in FIG. 7 includes 4 data centers, each including an ethernet network, computing elements, storage elements and a firewall. The data center 780 includes computing elements 784, storage elements 784 and firewall 781, all of which are coordinated via ethernet 782. The data center 785 includes computing elements 789, storage elements 788 and firewall 786, all of which are coordinated via ethernet 787. The data center 790 includes computing elements 794, storage elements 793 and firewall 791, all of which are coordinated via ethernet 792. The data center 795 includes computing elements 799, storage elements 798 and firewall 796, all of which are coordinated via ethernet 797. Many different virtual private cloud computing networks can be created using the elements of the cloud computing network shown in FIG. 7.

The cloud computing network of FIG. 7 is used to support virtual private cloud computing networks of any type including those examples described herein. Other variations and examples exist that include connection types that can be selected as building blocks using the network connectivity wizard describes herein. For example, multiple customers may be allowed to share an switched customer subnet behind a firewall for their own virtual machines. In this example, the virtual machines from different customers must not be able to communicate with each other via the layer 2 protocol. However, they must be able to talk to each other via the layer 3 protocol via the firewall. This feature is selectable by customers as an alternative to the network address translation approach also described herein.

Figure 8:
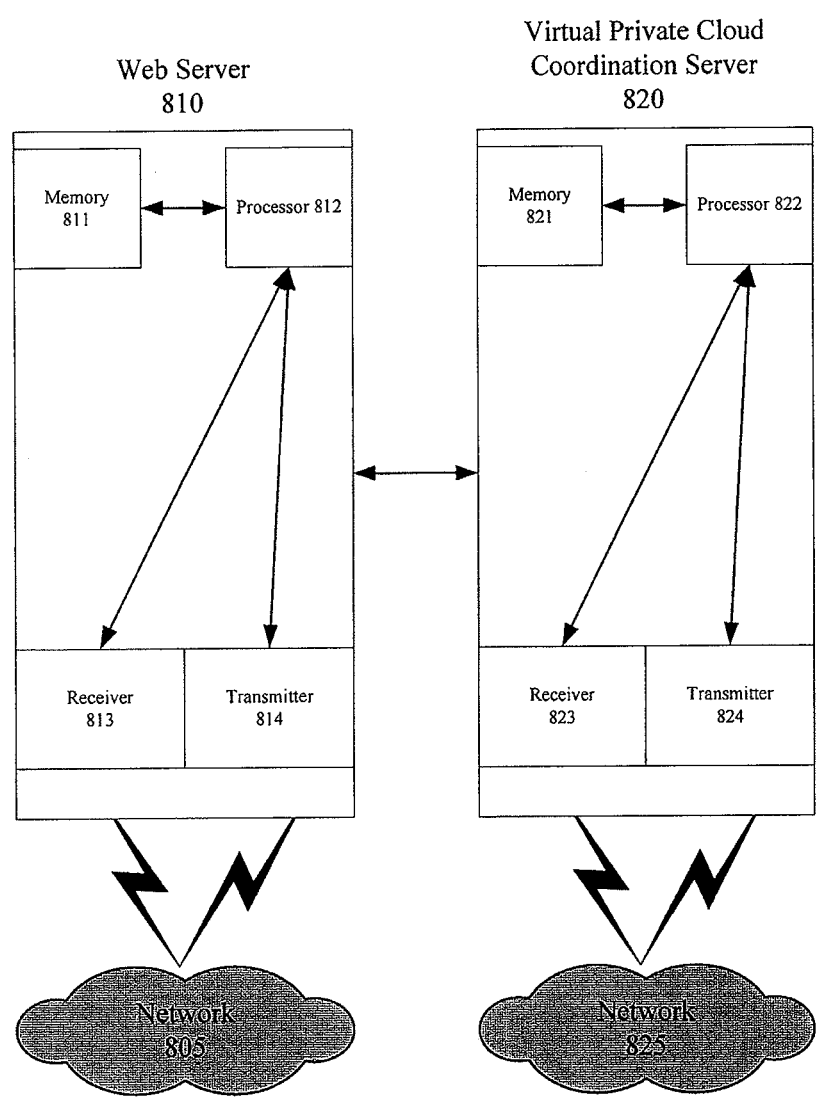
FIG. 8 shows an exemplary web server and an exemplary virtual private cloud coordination server for a network connectivity wizard to support automated creation of customized configurations for virtual private cloud computing networks, according to an aspect of the present disclosure.

FIG. 8 shows an exemplary web server and an exemplary virtual private cloud coordination server for a network connectivity wizard to support automated creation of customized configurations for virtual private cloud computing networks. In FIG. 8, web server 810 includes a memory 811, a processor 812, a receiver 813 and a transmitter 814. The receiver 813 and transmitter 814 communicate over network 805. The processor 812 processes instructions and data from the receiver 813 and memory 811, and forwards instructions or data to transmitter 814 for transmission or to memory 811 for storage. In FIG. 8, virtual private cloud coordination server 820 includes a memory 821, a processor 822, a receiver 823 and a transmitter 824. The receiver 823 and transmitter 824 communicate over network 825. The processor 822 processes instructions and data from the receiver 823 and memory 821, and forwards instructions or data to transmitter 824 for transmission or to memory 821 for storage.

The web server 810 and virtual private cloud coordination server 820 also communicate with each other in the embodiment of FIG. 8. The servers may communicate over a communications network, or may alternatively be implemented on the same physical computer.

As another example of a virtual private cloud computing network that can be created using the network configuration wizard described herein, an exemplary virtual data center in a virtual private cloud computing network may be provided with multiple different types of intra-cloud connectivities including public Internet and L3VPN for a virtual private network. A different routed customer subnet is connected to each intra-cloud connectivity, and switched customer subnets are connected to the respective routed customer subnets through firewalls. In this example, an intra-virtual data center customer subnet is provided access to each of the two switched customer subnets via separate virtual machines that interface the intra-virtual data center customer subnet and one or the other of the switched customer subnets. The two virtual machines in this example are reachable to each other via layer 2 by virtue of the intra-virtual data center customer subnet, but are differently reachable by the public and L3VPN intra-cloud connectivities. In this example, details for each of the intra-cloud connectivities, customer subnets, firewalls and virtual machines are selected using the network connectivity wizard described herein. In another example, an intra-virtual data center customer subnet may be placed behind a firewall so that interactions between two virtual machines may communicate with each other via the intra-virtual data center customer subnet only also across the firewall.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims. As an example, different examples of selectable building blocks are described herein. However, other building blocks may be provided so long has the building blocks have user-definable attributes and are translatable into network element configuration statements that instantiate an action particular to the building block for creating a virtual private cloud computing network.

As described above, according to an aspect of the present disclosure, a method of implementing a cloud computing network includes defining, for a cloud computing network including tangible network storage elements and tangible network computing elements, a library of network connectivity building blocks for designing a virtual private cloud computing network within the cloud computing network. Each building block having user-definable attributes and each building block being translatable into a set of network element configuration statements that instantiate an action particular to the building block. Usage rules specifying how the building blocks can be used are defined for the cloud computing network. Dynamically-selected building blocks from the library are accepted. The selected building blocks are assembled into a configuration template. The configuration template is validated against the usage rules. The virtual private cloud computing network is implemented in accordance with the validated configuration template.

According to another aspect of the present disclosure, the method also includes creating an implementation template instance of a validated template by filling in configuration parameter data for the validated template.

According to still another aspect of the present disclosure, the method also includes decomposing the implementation template instance into building block instances.

According to yet another aspect of the present disclosure, the method also includes translating the building block instances into configuration statements.

According to another aspect of the present disclosure, the configuration statements are downloaded to a set of tangible network storage elements and tangible network computing elements that define the virtual private cloud computing network.

According to still another aspect of the present disclosure, the virtual private cloud computing network is implemented with the set of tangible network storage elements and tangible network computing elements to which the configuration statements were downloaded.

According to yet another aspect of the present disclosure, the configuration statements are downloaded to tangible network routing elements that route communications within the virtual private cloud computing network.

According to another aspect of the present disclosure, the virtual private cloud computing network provides both Internet access and public intra-cloud connectivity within the virtual private cloud computing network.

According to still another aspect of the present disclosure, the virtual private cloud computing network comprises a virtual data center.

According to yet another aspect of the present disclosure, the dynamically-selected building blocks define how an end user is to connect to tangible network storage elements and tangible network computing elements within the virtual private cloud computing network.

According to another aspect of the present disclosure, the dynamically-selected building blocks define parameters for communications between tangible network storage elements and tangible network computing elements within the virtual private cloud computing network.

According to still another aspect of the present disclosure, the dynamically-selected building blocks define access restrictions to tangible network storage elements and tangible network computing elements within the virtual private cloud computing network.

According to yet another aspect of the present disclosure, the method is performed using input accepted via an internet website.

According to another aspect of the present disclosure, the method also includes optimizing the virtual private cloud computing network by automatically selecting tangible network storage elements and tangible network computing elements for the virtual private cloud computing network in accordance with predetermined criteria.

According to still another aspect of the present disclosure, the virtual private cloud computing network is implemented for a specified time period in accordance with the configuration statements.

According to yet another aspect of the present disclosure, the virtual private cloud computing network is implemented with virtual machines, local load balancers and firewalls each implemented using the tangible network storage elements and tangible network computing elements.

According to another aspect of the present disclosure, the virtual private cloud computing network is implemented in real-time and on-demand for a customer in accordance with the implementation template instance created by the customer.

According to still another aspect of the present disclosure, the virtual private cloud computing network is implemented in real-time and on-demand for a customer in accordance with the implementation template instance created for the customer.

According to an aspect of the present disclosure, at least one non-transitory computer readable medium stores a set of executable instructions for implementing a cloud computing network. The executable instructions, when executed by a processor, cause a computer to define, for a cloud computing network including tangible network storage elements and tangible network computing elements, a library of network connectivity building blocks for designing a virtual private cloud computing network within the cloud computing network. Each building block has user-definable attributes and is translatable into one or more network element configuration statements that instantiate an action particular to the building block. Usage rules specifying how the building blocks can be used are defined for the cloud computing network. Dynamically-selected building blocks from the library are accepted. The selected building blocks are assembled into a configuration template. The configuration template is validated against the usage rules. The virtual private cloud computing network is implemented in accordance with the validated configuration template.

According to an aspect of the present disclosure, at least one computer for implementing a cloud computing network includes a memory that stores a set of executable instructions for designing a virtual private cloud computing network within a cloud computing network including tangible network storage elements and tangible network computing elements. The computer also includes a tangible non-transitory processor. The executable instructions, when executed by the processor, define for the cloud computing network a library of network connectivity building blocks for designing the virtual private cloud computing network within the cloud computing network. Each building block has user-definable attributes and each building block is translatable into a set of network element configuration statements that instantiate an action particular to the building block. The executable instructions, when executed by the processor, define for the cloud computing network, usage rules specifying how the building blocks can be used. The executable instructions, when executed by the processor, accept dynamically-selected building blocks from the library. The executable instructions, when executed by the processor, assemble the selected building blocks into a configuration template. The executable instructions, when executed by the processor, validate the configuration template against the usage rules. The virtual private cloud computing network is implemented in accordance with the validated configuration template.

According to aspects of the present disclosure, customized virtual private cloud computing networks can be provided dynamically at a moment's notice without a priori planning and reservation. A virtual private cloud computing network provider as described herein can flexibly meet diverse requirements of different customers that request different configurations and interconnections for virtual private cloud computing networks to support customer applications that are implemented on virtual private cloud computing networks.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of implementing a user-defined network cloud, comprising:
    providing, to a user, an interface for selecting a plurality of network connectivity features for designing a virtual private cloud computing network comprising tangible storage elements and tangible computing elements, each network connectivity feature having an attribute for connecting the tangible storage elements and the tangible computing elements in the virtual private cloud computing network, and each network connectivity feature being translatable into a network element configuration statement that instantiates an action particular to the network connectivity feature;
    defining usage rules specifying how the network connectivity features can be used;
    accepting selected network connectivity features from the user;
    configuring the virtual private cloud computing network in accordance with the selected network connectivity features using the tangible storage elements and tangible computing elements in the virtual private cloud computing network, and
    implementing the virtual private cloud computing network in accordance with the selected network connectivity features using the tangible storage elements and tangible computing elements in the virtual private cloud computing network.

2. The method of claim 1,
    wherein the virtual private cloud computing network comprises a layer 3 network.

3. The method of claim 1,
    wherein the virtual private cloud computing network comprises a layer 2 network.

4. The method of claim 1,
wherein the network connectivity features include a network connectivity feature that enables the user to request tangible storage elements and tangible computing elements for implementing the virtual private cloud computing network.

5. The method of claim 1,
wherein the network connectivity features include a network connectivity feature that enables the user to link tangible storage elements and tangible computing elements into a local subnet of the virtual private cloud computing network.

6. The method of claim 1,
wherein the network connectivity features include a network connectivity feature that enables the user to link customer subnets into a virtual data center of the virtual private cloud computing network.

7. The method of claim 1,
wherein the network connectivity features include a network connectivity feature that enables the user to configure new virtual data centers as clones of existing virtual data centers but in a different actual data center than one used by the existing virtual data center.

8. The method of claim 1,
wherein the virtual private cloud computing network provides both internet access and public intra-cloud connectivity within the virtual private cloud computing network.

9. The method of claim 8,
wherein the virtual private cloud computing network comprises a virtual data center.

10. The method of claim 1,
wherein the selected features define how tangible storage elements and tangible computing elements are to be connected within the virtual private cloud computing network.

11. The method of claim 1,
wherein the selected features define parameters for communications between tangible storage elements and tangible computing elements within the virtual private cloud computing network.

12. The method of claim 1,
wherein the selected features define access restrictions to tangible storage elements and tangible computing elements within the virtual private cloud computing network.

13. The method of claim 1,
wherein the method is performed using input accepted via an internet website.

14. The method of claim 1,
wherein the method is performed using input accepted by an application downloaded to a user computing device.

15. The method of claim 1,
wherein the virtual private cloud computing network is implemented for a specified time period.

16. The method of claim 1,
wherein the virtual private cloud computing network is implemented with virtual machines, local load balancers and firewalls each implemented using the tangible storage elements and tangible computing elements.

17. The method of claim 1,
wherein the virtual private cloud computing network is implemented in real-time and on-demand for a customer in accordance with requests from the user.

18. The method of claim 1,
wherein the virtual private cloud computing network is implemented in real-time and on-demand for a customer in accordance with requests for the customer.

19. A non-transitory computer readable medium that stores a set of executable instructions for implementing a user-defined network cloud, the executable instructions, when executed by a processor, causing a computer to perform a process comprising:
providing, to a user, an interface for selecting a plurality of network connectivity features for designing a virtual private cloud computing network comprising tangible storage elements and tangible computing elements, each network connectivity feature having an attribute for connecting the tangible storage elements and the tangible computing elements in the virtual private cloud computing network, and each network connectivity feature being translatable into a network element configuration statement that instantiates an action particular to the network connectivity feature;
defining usage rules specifying how the network connectivity features can be used;
accepting selected network connectivity features from the user;
configuring the virtual private cloud computing network in accordance with the selected network connectivity features using the tangible storage elements and tangible computing elements in the virtual private cloud computing network, and
implementing the virtual private cloud computing network in accordance with the selected network connectivity features using the tangible storage elements and tangible computing elements in the virtual private cloud computing network.

20. A computer for implementing a user-defined network cloud, comprising:
memory that stores a set of executable instructions for designing a virtual private cloud computing network comprising tangible storage elements and tangible computing elements; and
a non-transitory processor;
wherein the executable instructions, when executed by the processor, cause the computer to implement a process comprising:
providing, to a user, an interface for selecting a plurality of network connectivity features for designing a virtual private cloud computing network comprising tangible storage elements and tangible computing elements, each network connectivity feature having an attribute for connecting the tangible storage elements and the tangible computing elements in the virtual private cloud computing network, and each network connectivity feature being translatable into a network element configuration statement that instantiates an action particular to the network connectivity feature;
defining usage rules specifying how the network connectivity features can be used;
accepting selected network connectivity features from the user;
configuring the virtual private cloud computing network in accordance with the selected network connectivity features using the tangible storage elements and tangible computing elements in the virtual private cloud computing network, and
implementing the virtual private cloud computing network in accordance with the selected network connectivity features using the tangible storage elements and tangible computing elements in the virtual private cloud computing network.

* * * * *